F. B. MILLS.
MACHINE FOR THE MANUFACTURE OF BUTTONS.
APPLICATION FILED DEC. 8, 1917.

1,433,963.

Patented Oct. 31, 1922.
18 SHEETS—SHEET 4.

INVENTOR:
F. B. MILLS
BY: [signature]
ATTORNEY.

F. B. MILLS.
MACHINE FOR THE MANUFACTURE OF BUTTONS.
APPLICATION FILED DEC. 8, 1917.
1,433,963.
Patented Oct. 31, 1922.
18 SHEETS—SHEET 5.
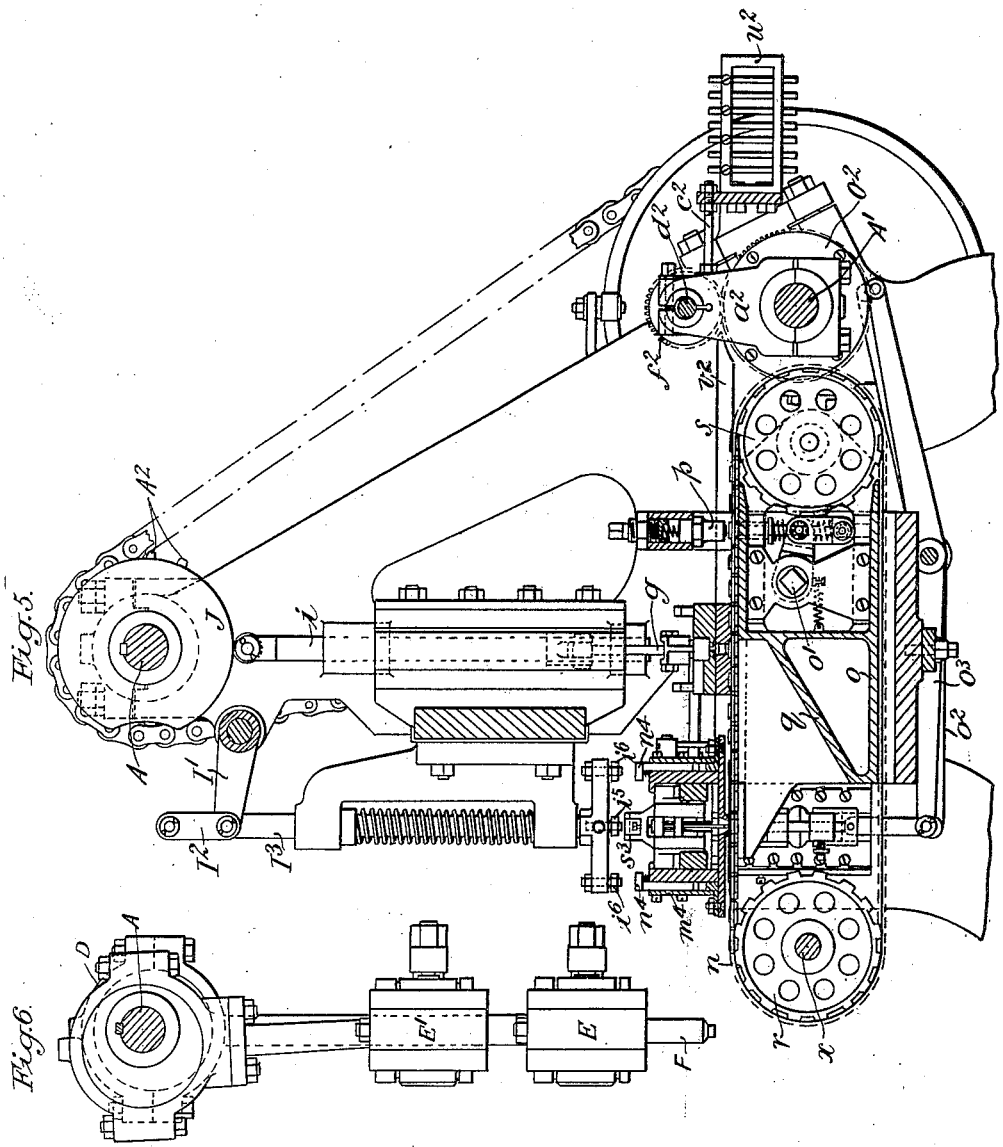
INVENTOR:
F. B. MILLS
BY: H van Detemnel
ATTORNEY.

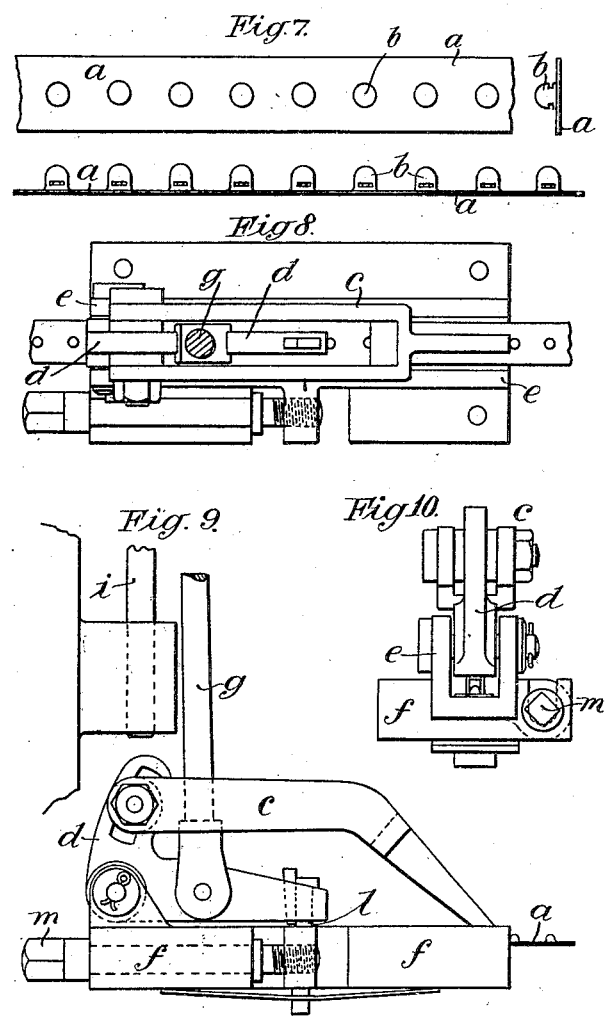

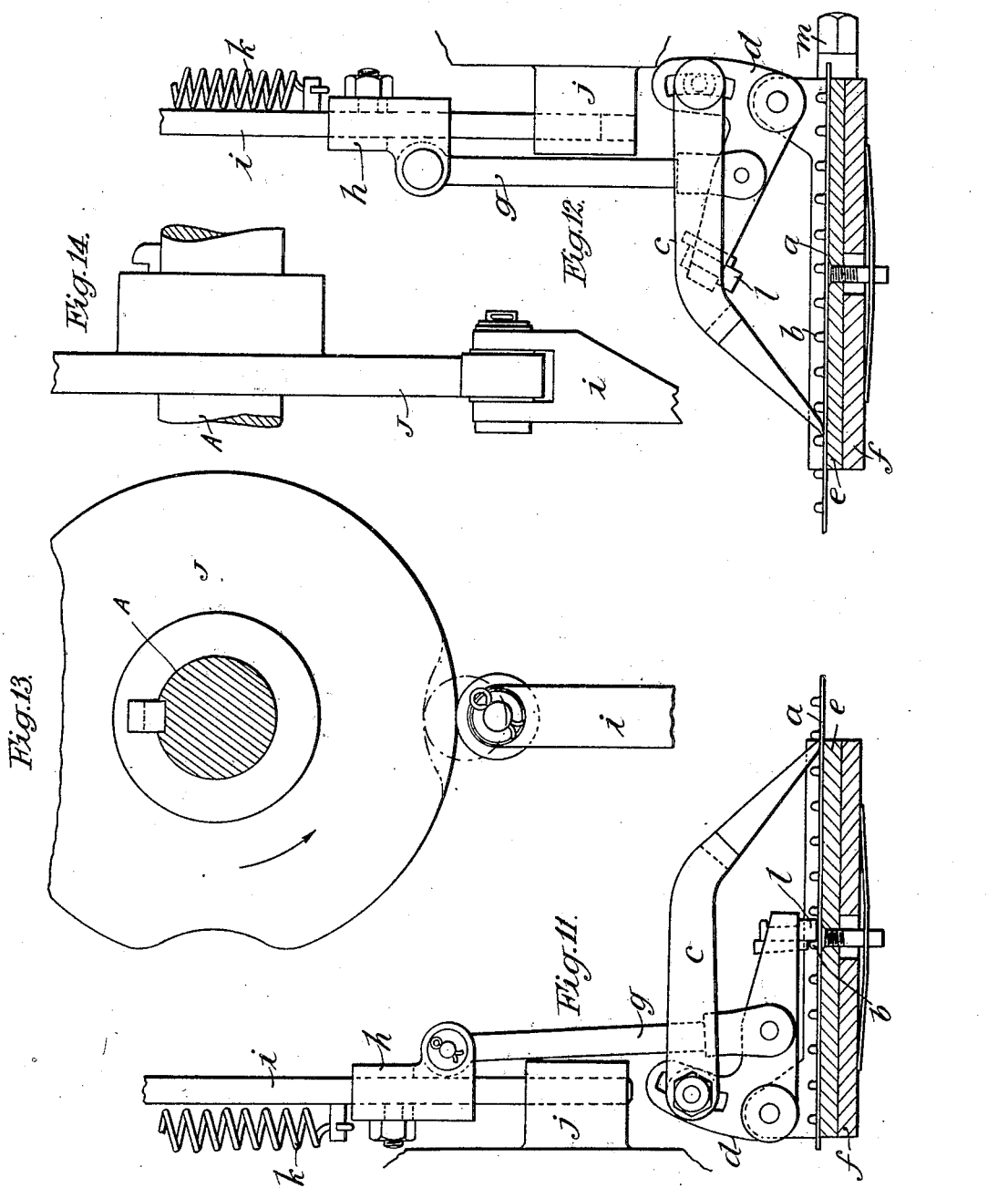

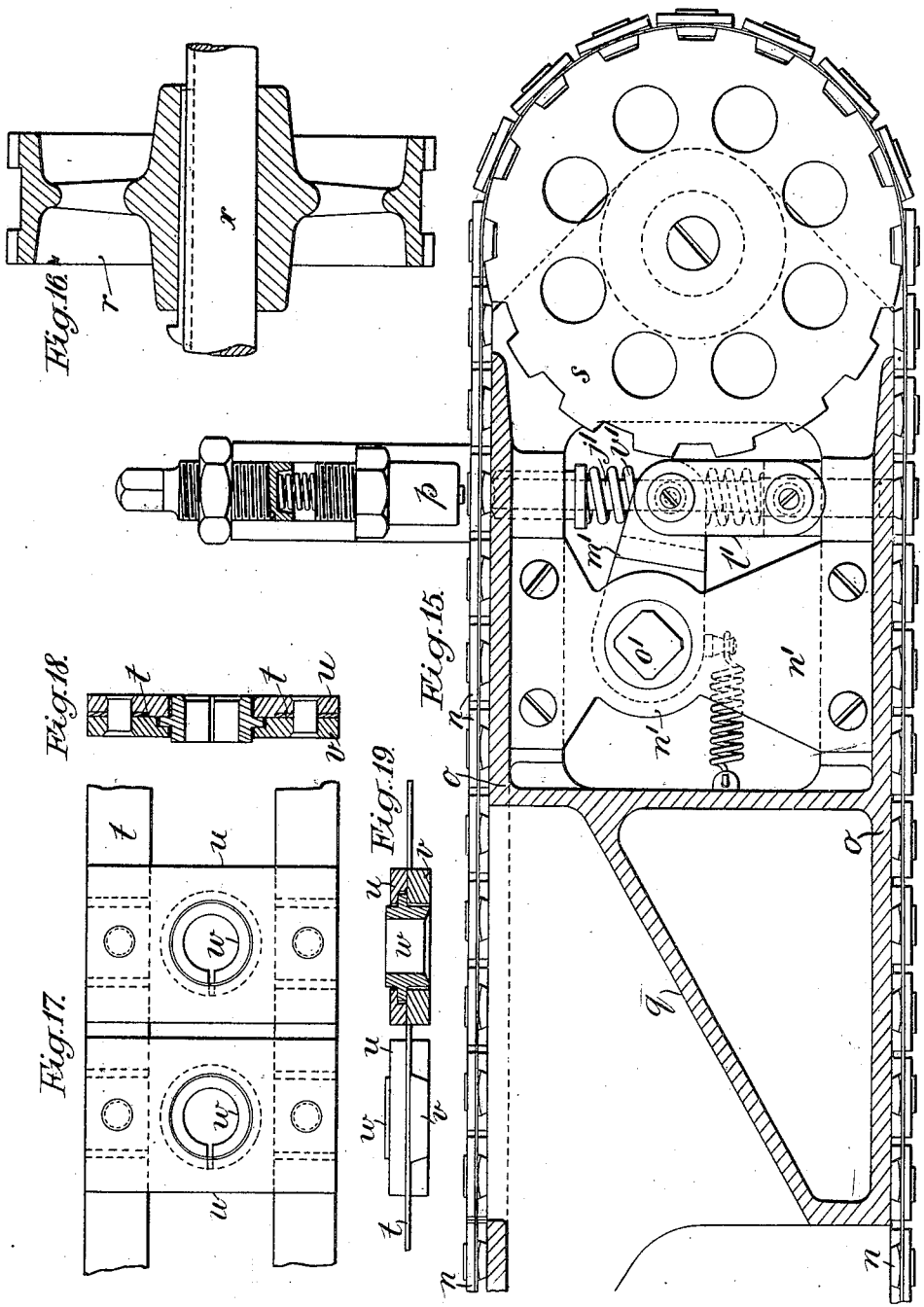

F. B. MILLS.
MACHINE FOR THE MANUFACTURE OF BUTTONS.
APPLICATION FILED DEC. 8, 1917.
1,433,963.
Patented Oct. 31, 1922.
18 SHEETS—SHEET 9.
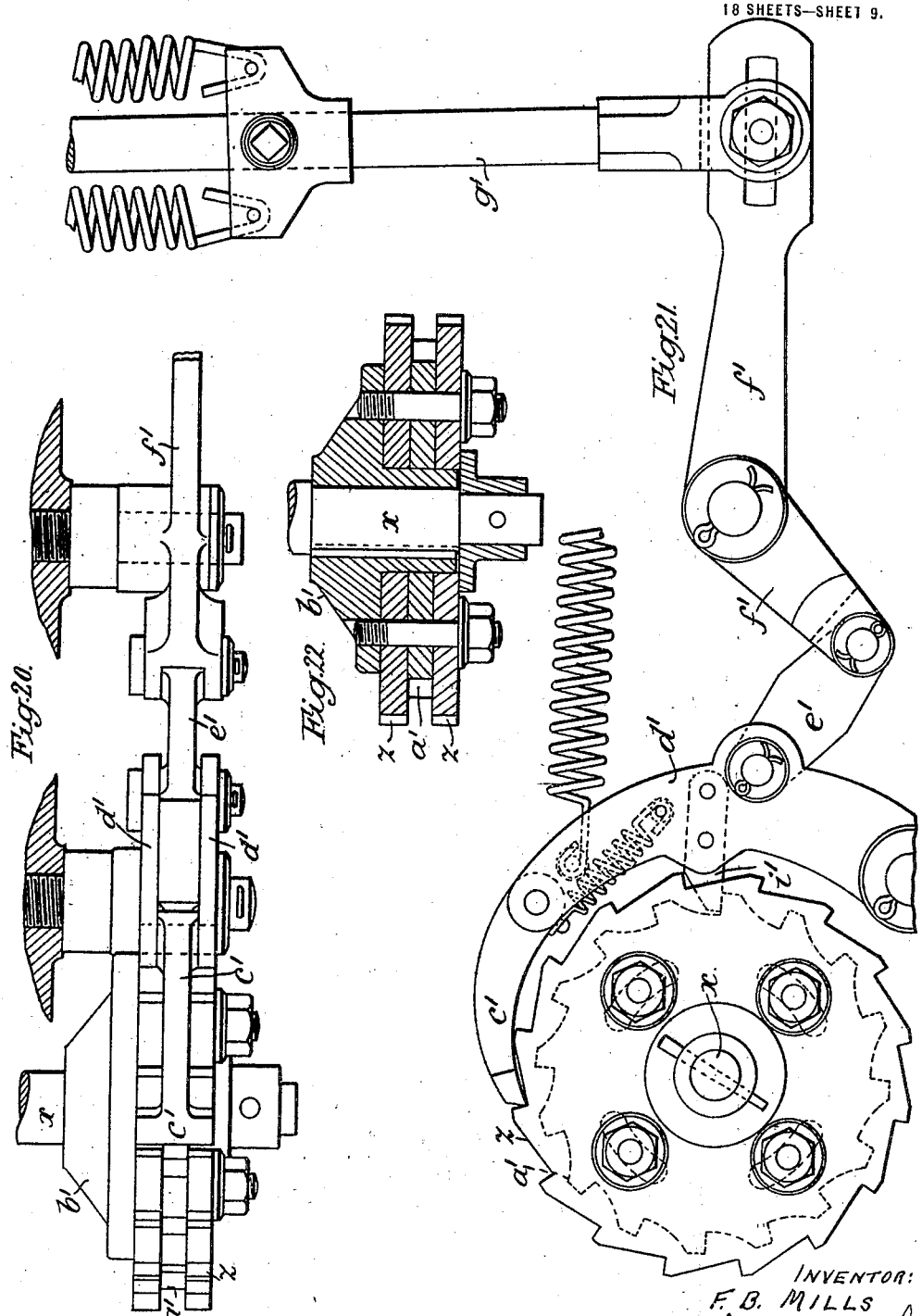
INVENTOR:
F. B. MILLS
BY: [signature]
ATTORNEY.

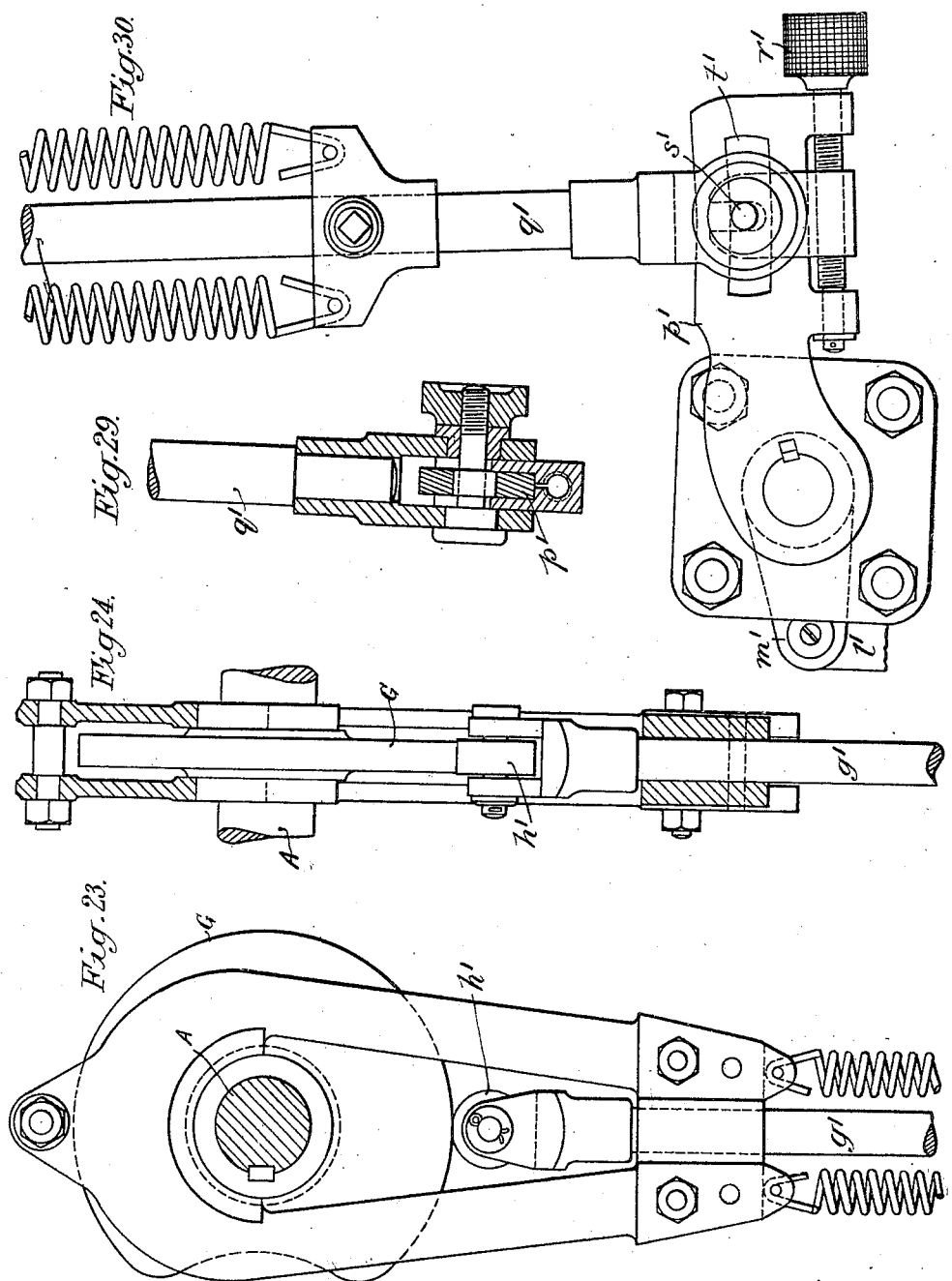

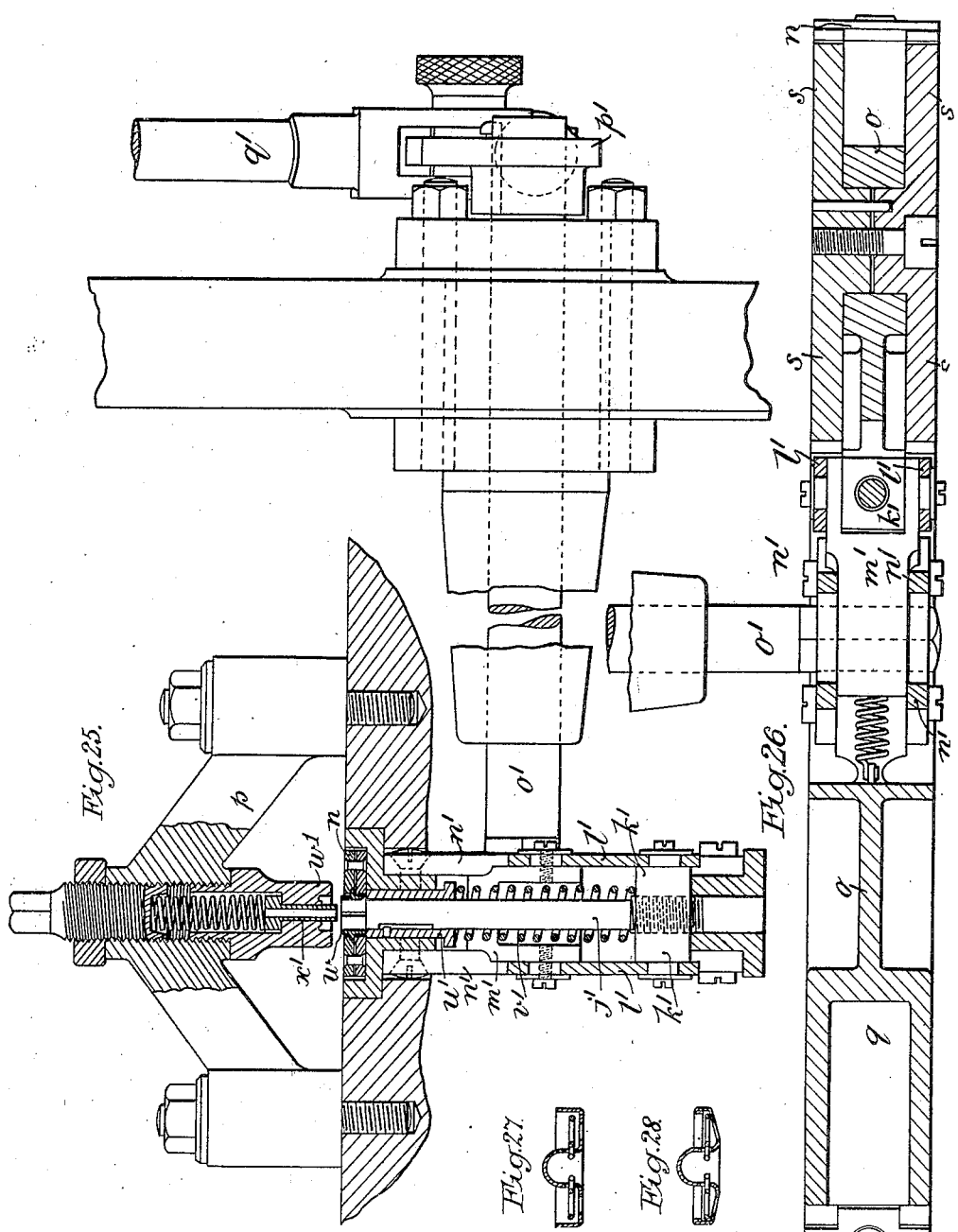

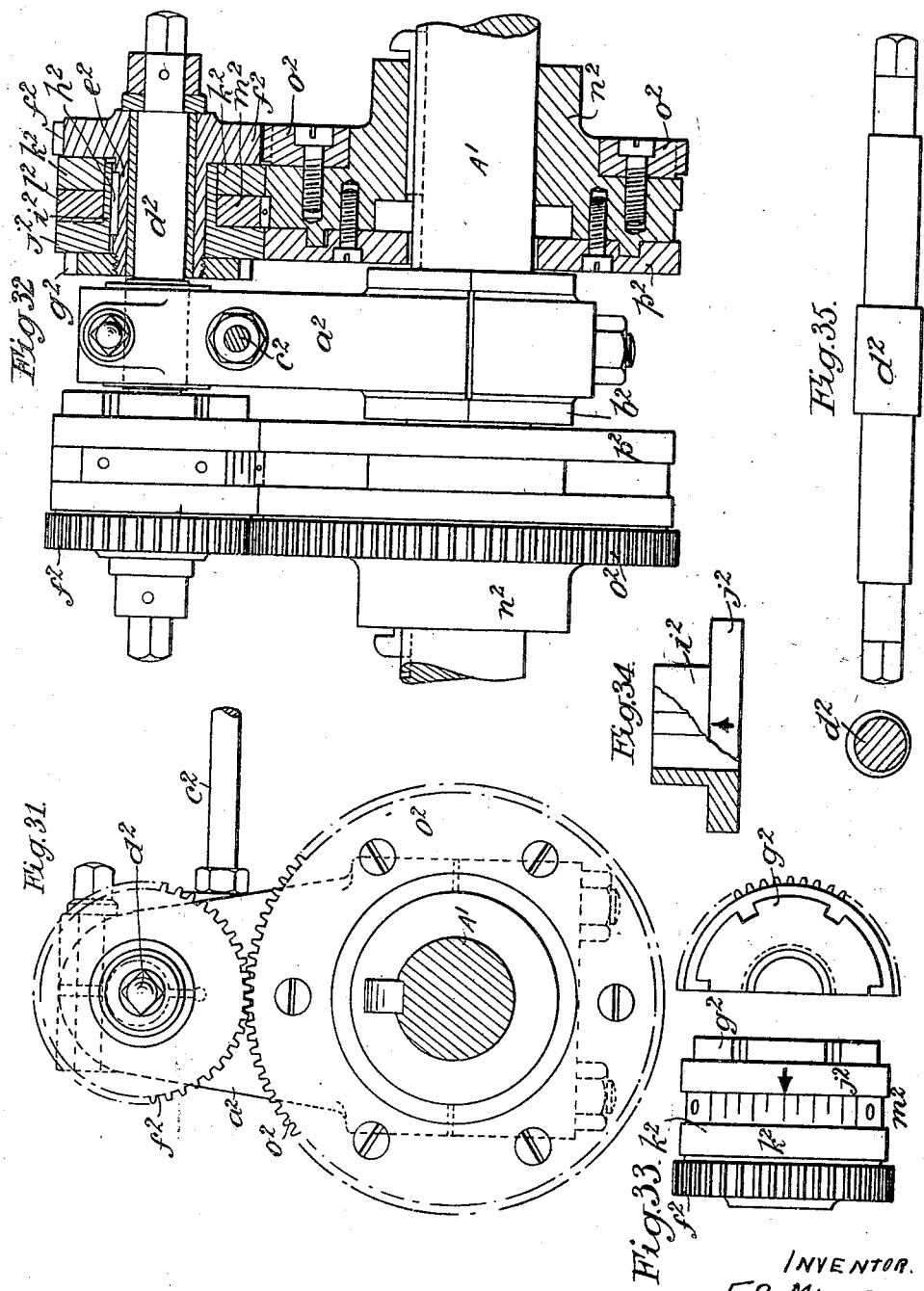

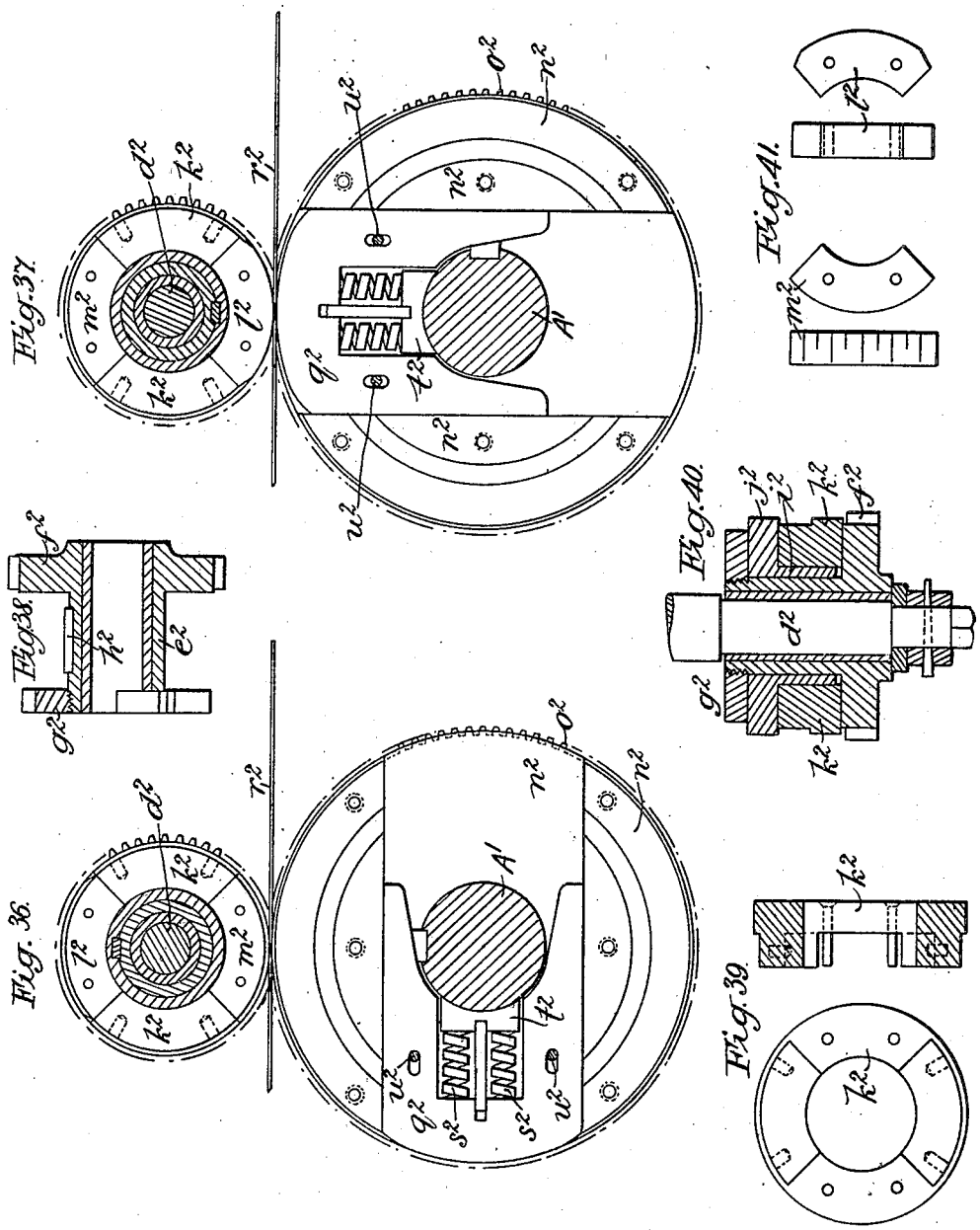

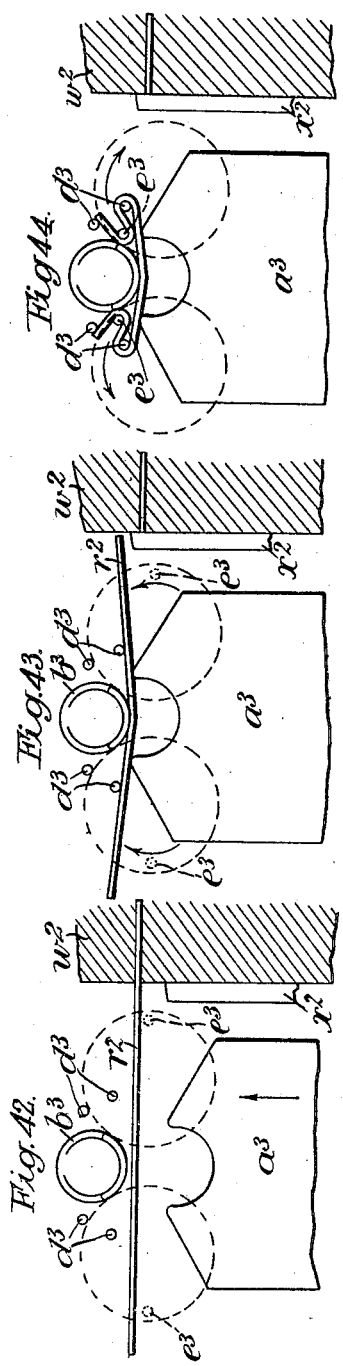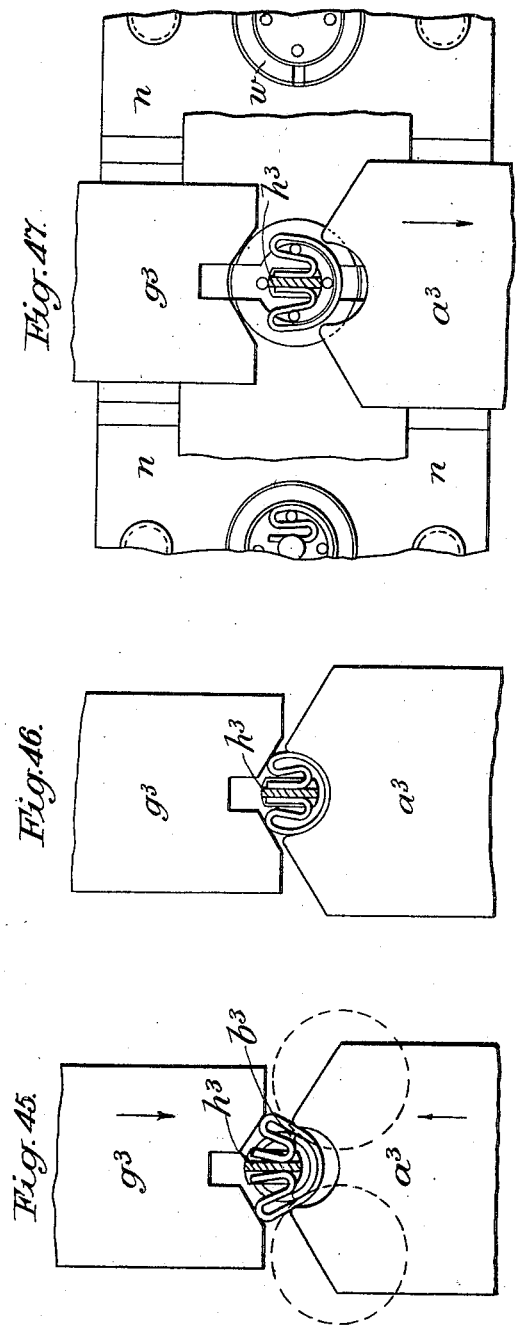

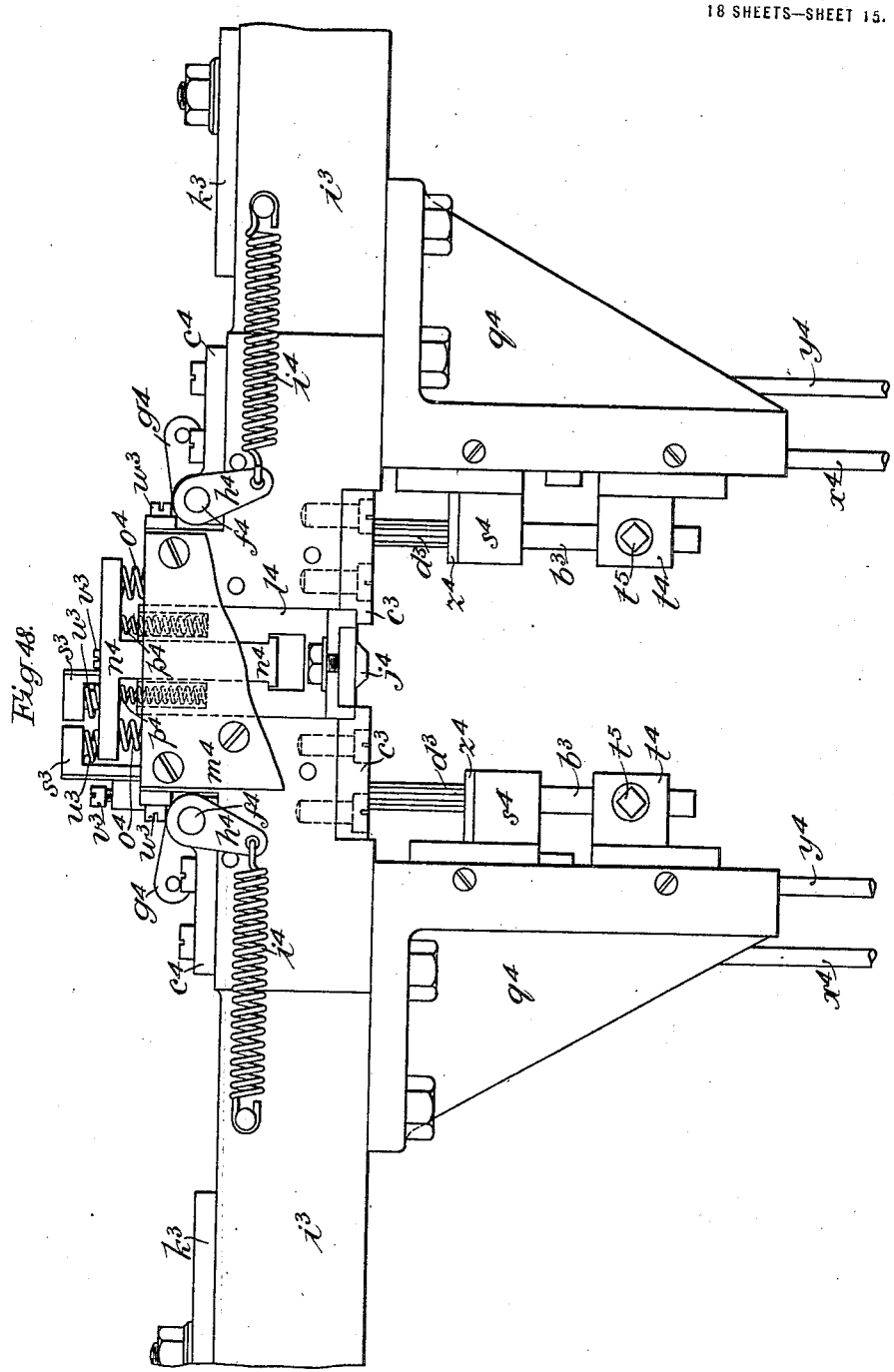

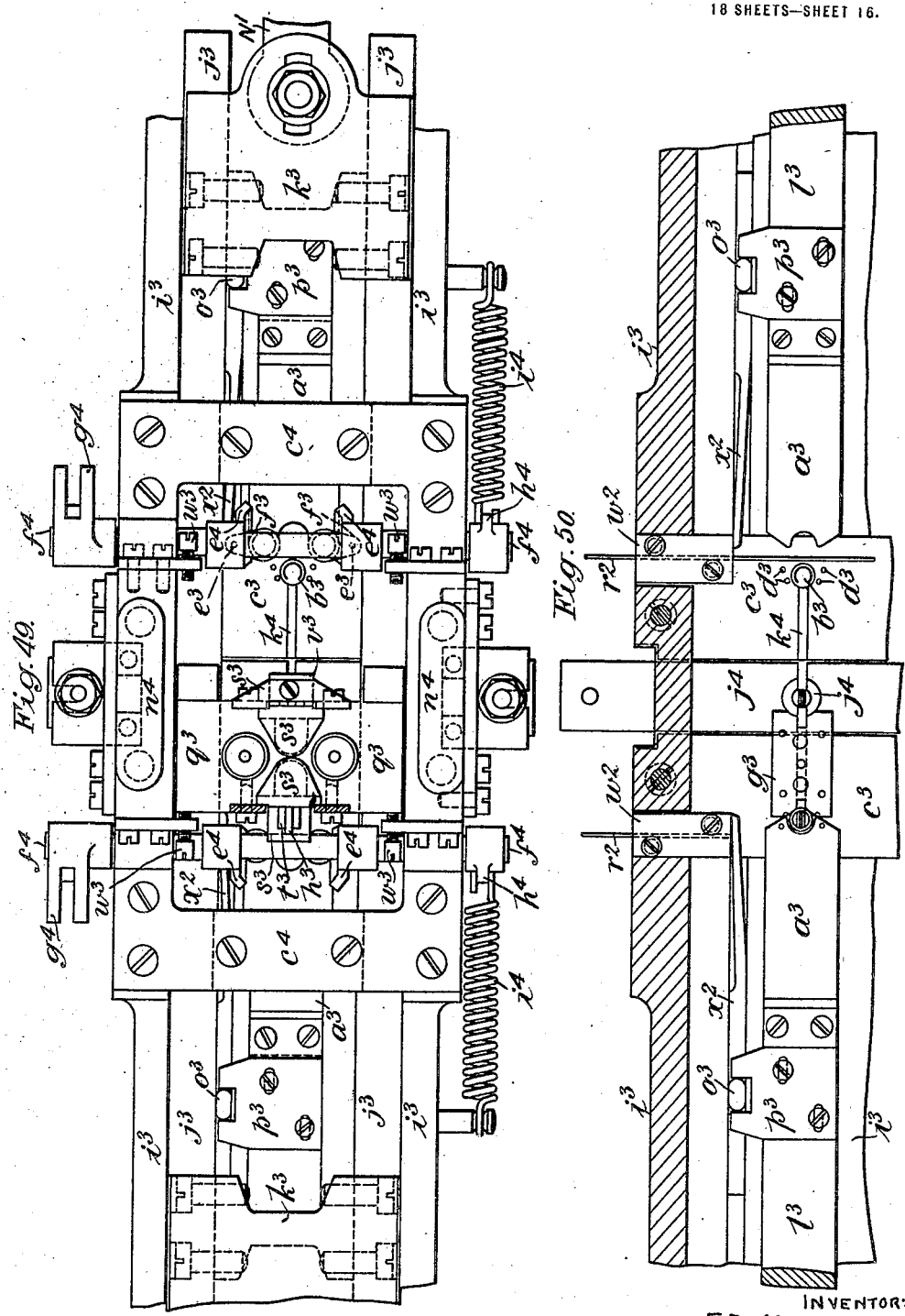

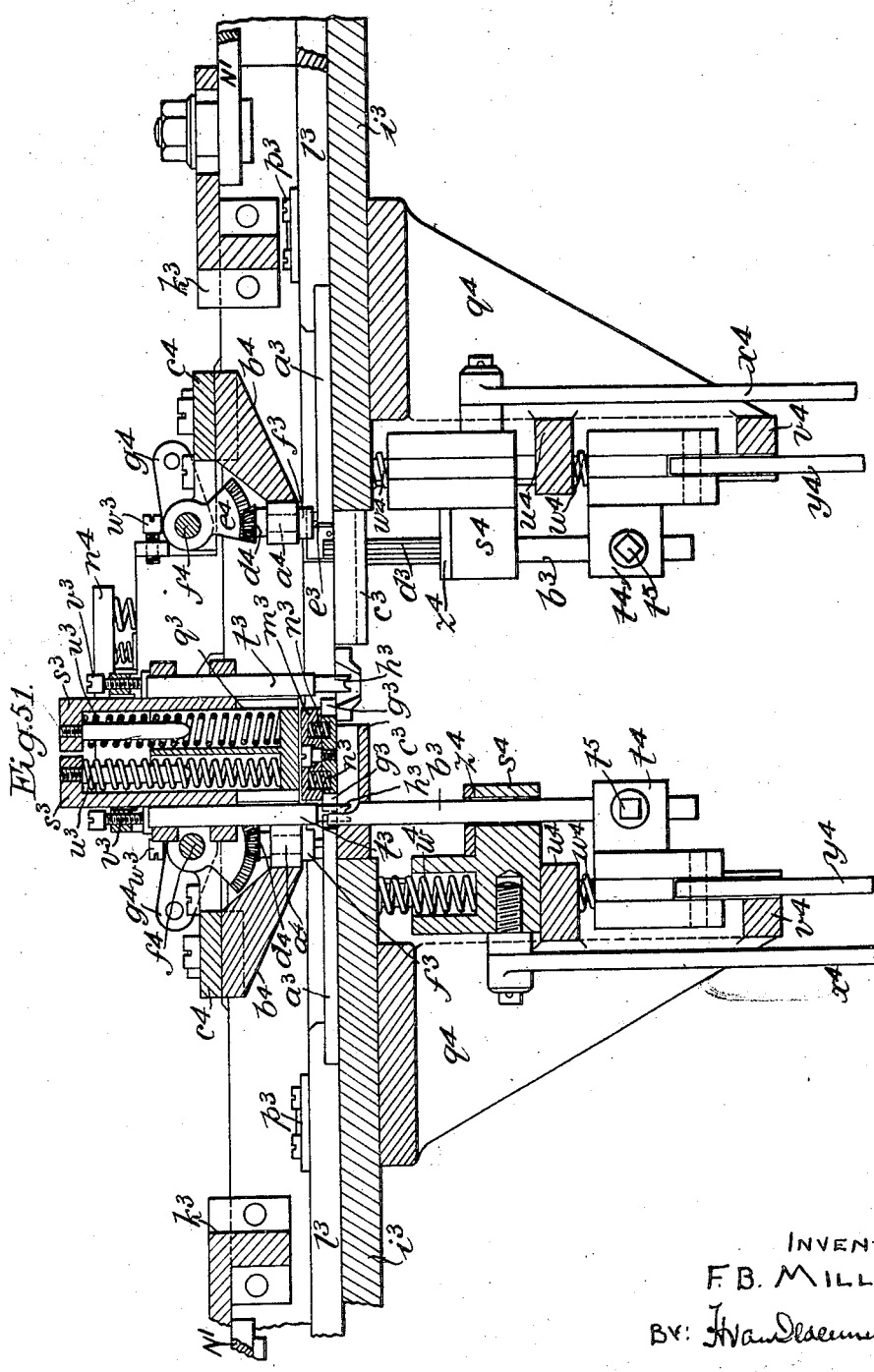

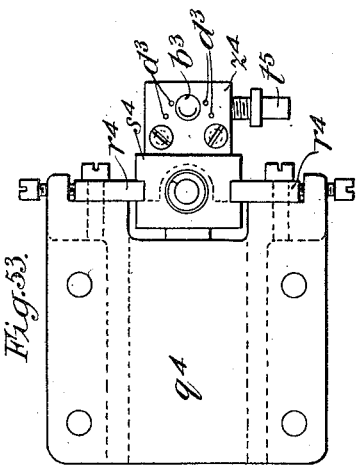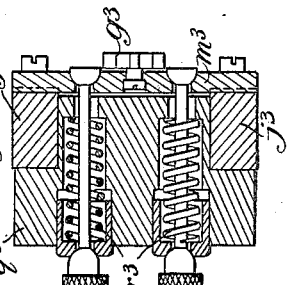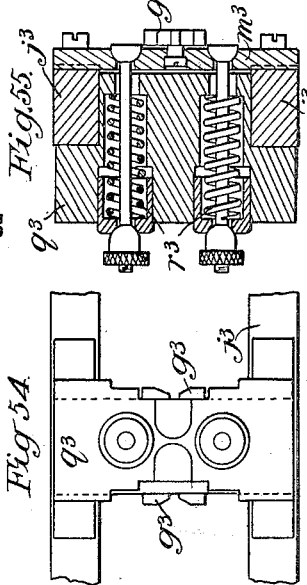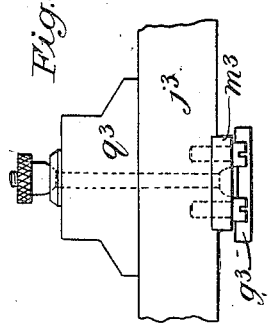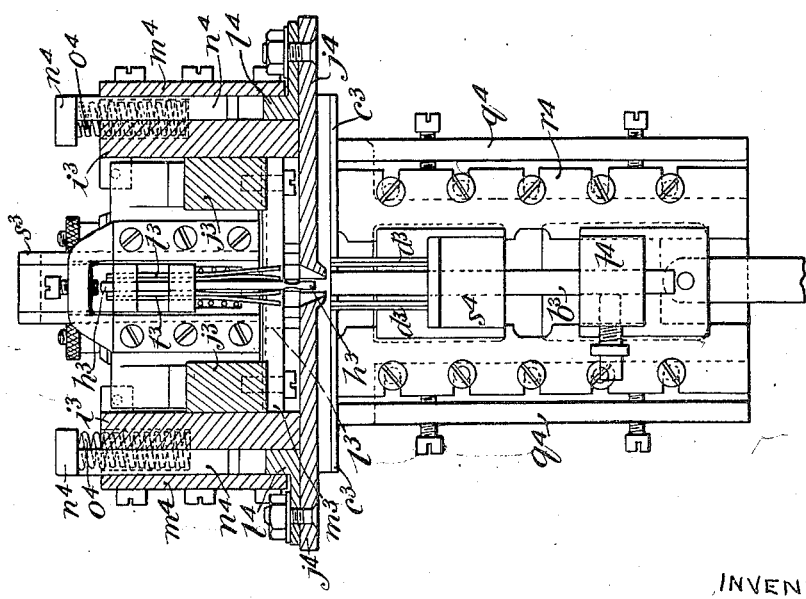

Patented Oct. 31, 1922.

1,433,963

UNITED STATES PATENT OFFICE.

FRANK BRACEBRIDGE MILLS, OF FROGMARSH MILLS, NEAR STROUD, ENGLAND.

MACHINE FOR THE MANUFACTURE OF BUTTONS.

Application filed December 8, 1917. Serial No. 206,289.

(GRANTED UNDER THE PROVISIONS OF THE ACT OF MARCH 3, 1921, 41 STAT. L., 1313.)

*To all whom it may concern:*

Be it known that FRANK BRACEBRIDGE MILLS, a subject of the King of Great Britain and Ireland, residing at Frogmarsh Mills, near Stroud, Gloucestershire, England, has invented certain new and useful Improvements in Machines for the Manufacture of Buttons (for which I have filed application in Great Britain Aug. 3, 1916, Patent No. 111,117), of which the following is a specification.

This invention for improvements in machines for the manufacture of press button fasteners relates to the manufacture of the type of metal fastener in which a lower part or "stud" provided with a necked projection or shank is adapted to enter a dome-like socket in an upper part or "eyelet" containing a spring of crescent or other suitable form which engages the neck of the "stud" to retain the two parts of the button in their inter-locked positions and particularly to machines for the manufacture of the upper part or the eyelet only of the said buttons wherein are provided means for automatically stamping and forming single eyelet shells consecutively from a narrow metal strip and depositing them one at a time in a conveying device, bending or forming the spring, conveying the spring to and inserting it in the shell, and turning over the open end of the shell to retain the spring in position and consists in an improved construction of the operating tools or devices and arrangement of same in the machine in relation to the device employed to convey the eyelet in process of manufacture from one tool to the next, and an improved construction and arrangement of the said conveying device whereby the shell of the eyelet is caused to follow a rectilineal path as it passes through the machine from one tool to another so that operating tools may be duplicated and placed over and on both sides of the same conveying device enabling similar operations to take place simultaneously, overlap, or follow in continuous or unbroken succession the said improvements having for their object an increased output of the machine by reason of the number of productive operations performed in given time being increased and unproductive periods in the cycle of operations reduced to a minimum.

The invention is hereinafter described with reference to the accompanying drawings in which:

Fig. 5 is a central transverse section of the machine.

Fig. 6 is a side elevation of the blanking and cupping tool.

Fig. 7 illustrates in plan, side elevation and end elevation the previously prepared metallic strip from which the shells of the eyelets are stamped.

Figs. 8 to 10 are respectively a plan, side elevation and an end elevation of the strip feed and locking mechanism.

Figs. 11 and 12 are side elevations partly in section illustrating clearly the action of the feed and locking mechanism on the strip.

Figs. 13 and 14 are detail side and edge views of the cam which operates the strip feed and locking mechanism.

Fig. 15 is an elevation partly in longitudinal section showing on a larger scale a portion of the conveyor for the eyelet shells, its carrier or guide and a turning over tool associated therewith.

Fig. 16 is a transverse section of the conveyor driving wheel, and

Figs. 17, 18 and 19 are respectively plan, transverse section and longitudinal section of a part of the conveyor.

Figs. 20 and 21 are plan and side elevation respectively of mechanism for imparting an intermittent or step by step forward motion to the conveyor.

Fig. 22 is a sectional plan of a group of ratchet wheels forming part of the step by step mechanism.

Figs. 23 and 24 are detail side and edge views of cam mechanism therefor.

Figs. 25 and 26 are transverse section and horizontal section respectively taken through the conveyor, its carrier and associated turning over tool.

Figs. 27 and 28 illustrate in sectional elevation an eyelet before and after being subjected to the operation of the turning over tool.

Figs. 29 and 30 are detail vertical section and side elevation respectively of adjustable mechanism arranged between the turning over tool and its operating cam.

Figs. 31 and 32 are elevations at right angles of the wire feed mechanism, Fig. 32 being partly in section.

Figs. 33, 34 and 35 are detail views of the same.

Figs. 36 and 37 are sectional elevations illustrating the construction of the feed rolls and showing the operative parts thereof in different positions.

Figs. 38, 39, 40 and 41 are detail views.

Figs. 42 to 47 are plans drawn on a larger scale showing different operative positions of the parts of the spring forming mechanism which operate directly on the wire.

Fig. 48 is the front elevation of the pair of spring forming devices removed from the machine.

Fig. 49 is a plan of the spring forming devices.

Fig. 50 is a similar view to Fig. 49 but with parts of the mechanism removed.

Fig. 51 is a longitudinal section of the spring forming mechanism.

Fig. 52 is a transverse section of the same.

Figs. 53 to 56 are detail views.

As shown in Figs. 1 to 5 the whole of the automatic operations are effected through suitable connections from an upper or eccentric shaft A provided with a belt pulley and fly wheel and a lower or cam shaft $A^1$ driven from the shaft A through chain gear, the chain wheel $A^2$ being mounted on one end of the shaft A and the driving pulley $A^3$ at the other end.

On the shaft A are mounted three eccentrics B, C, D, the two outer eccentrics B, D, being connected through rods $B^1$, $D^1$, to the lower block or cross head E carrying the blanking tool F, while the middle eccentric C is connected by a shorter connecting rod $C^1$ to the upper block or cross head $E^1$ carrying the cupping tool $F^1$ which passes through the blanking tool.

Near the ends of shaft A cams G, H are mounted which actuate respectively mechanism hereinafter fully described for imparting a step by step or intermittent forward movement to the conveyor, and mechanism for turning over the edge of the eyelet shell to secure the spring in position.

Other cams I, J, are also mounted on the shaft A. Cam I operates through a bell crank lever $I^1$ and links $I^2$, a vertical plunger $I^3$ which controls the insertion of the spring in the eyelet shell.

Cam J operates the strip feed mechanism. On the cam shaft $A^1$ at opposite ends thereof are pairs of cams L, $L^1$, which actuate through levers M, $M^1$, and adjustable links N, $N^1$, slides carrying the spring forming tools. At the middle of the shaft $A^1$ are mounted two wire feeding devices which are described in detail hereinafter, and adjacent to the wire feeding mechanism on opposite sides thereof are mounted pairs of cams O, $O^1$, actuating through levers $O^2$, $O^3$, and links $x^4$, $y^4$, vertically reciprocating slide blocks carrying the central stud and pins which pass upwards through a die plate and assist in forming the springs. Face cams P, $P^1$, also carried on the shaft $A^1$ actuate through levers Q, $Q^1$, rocking shafts R, $R^1$, arms S, $S^1$, links T, $T^1$, and arms or cranks $q^4$, mechanism for oscillating spring bending pins hereinafter fully described.

Figure 3:
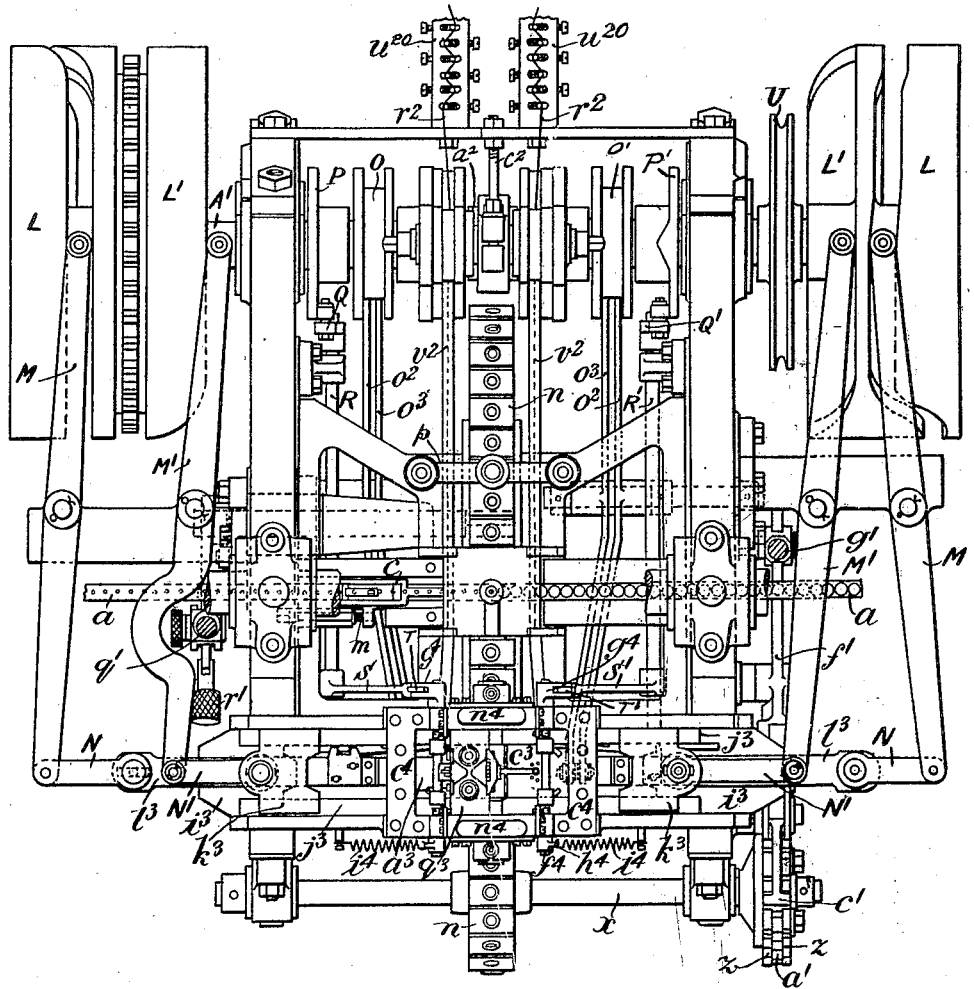
Fig. 3 is a plan with some of the upper parts of the machine including the driving or eccentric shaft left out for the sake of clearness.
Figure 4:
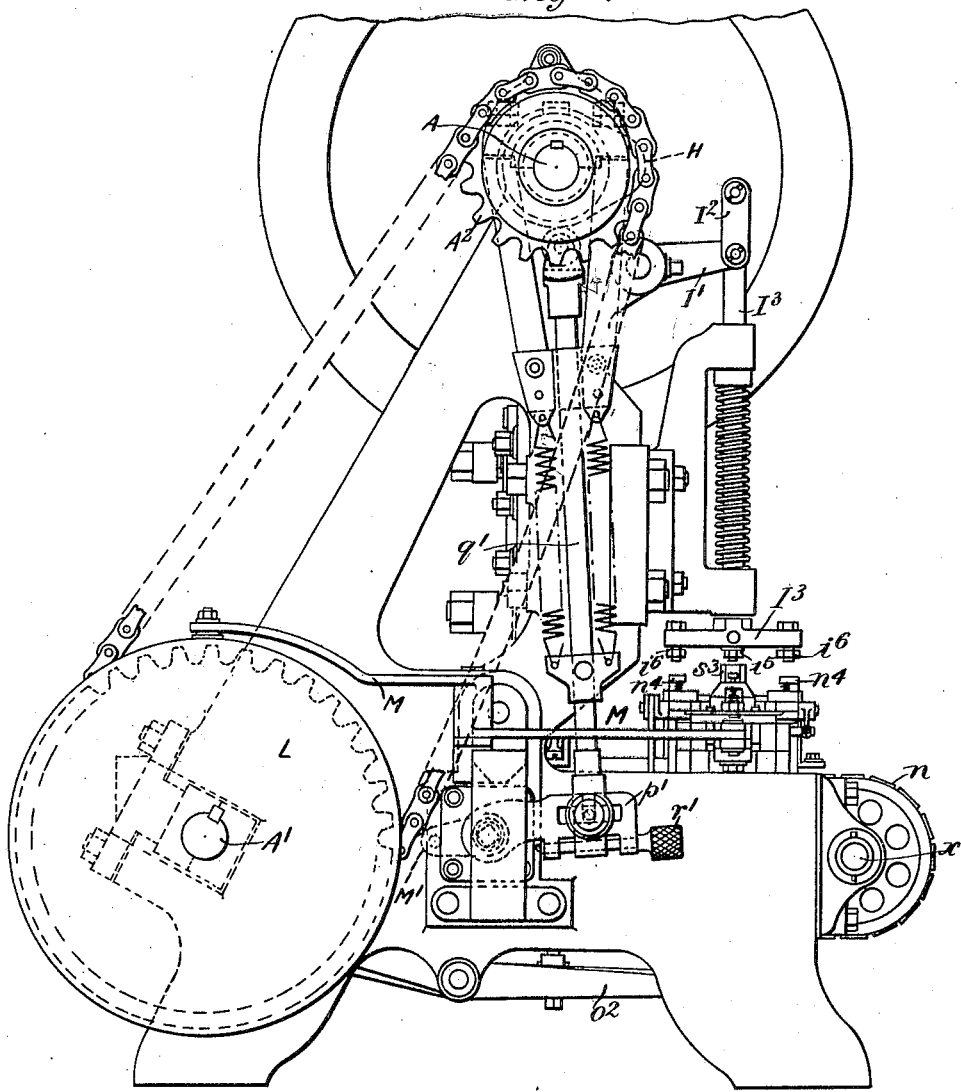
Fig. 4 is a left hand end elevation of the machine.

A grooved pulley U keyed on the shaft $A^1$ Fig. 3 is provided for driving through suitable gear the roller not shown on which the scrap strip is wound up.

Figure 1:
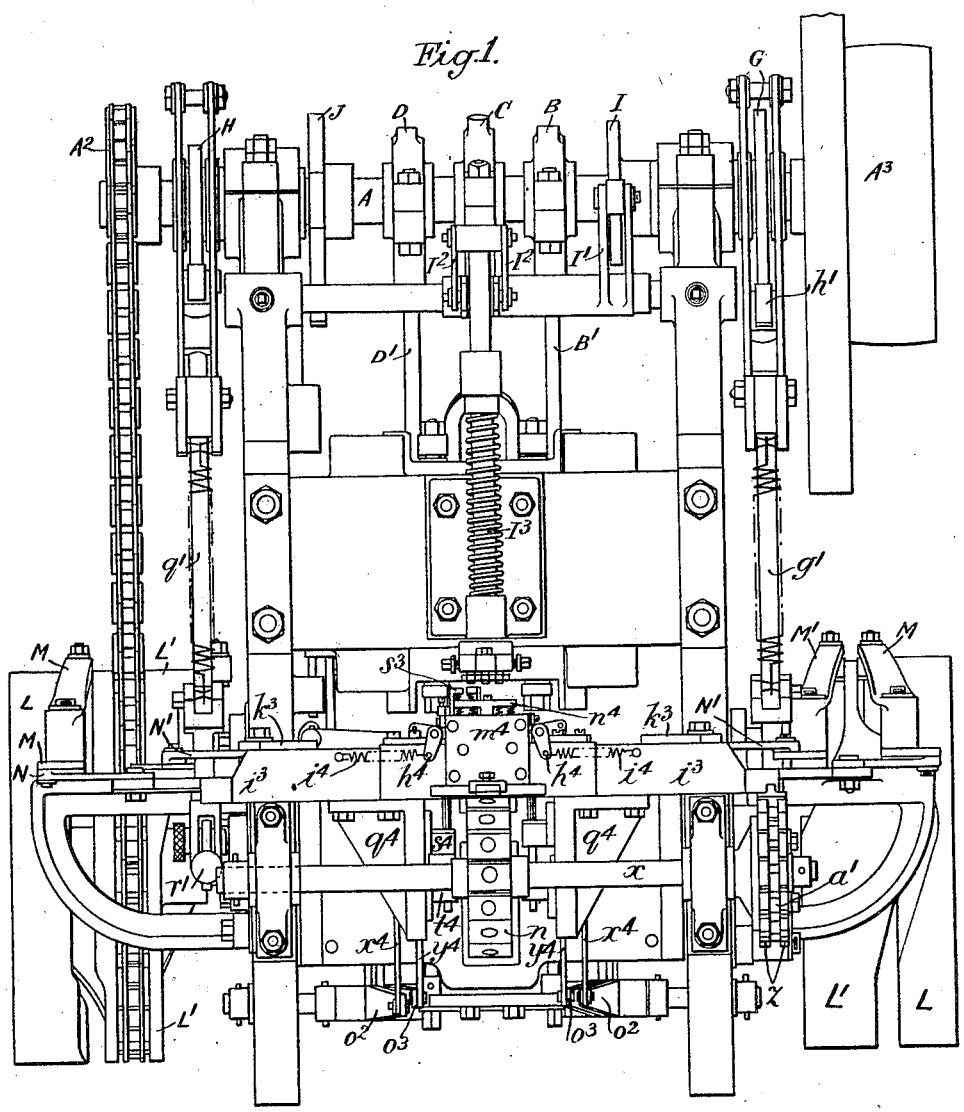
Fig. 1 is a front elevation of a machine constructed according to this invention.
Figure 2:
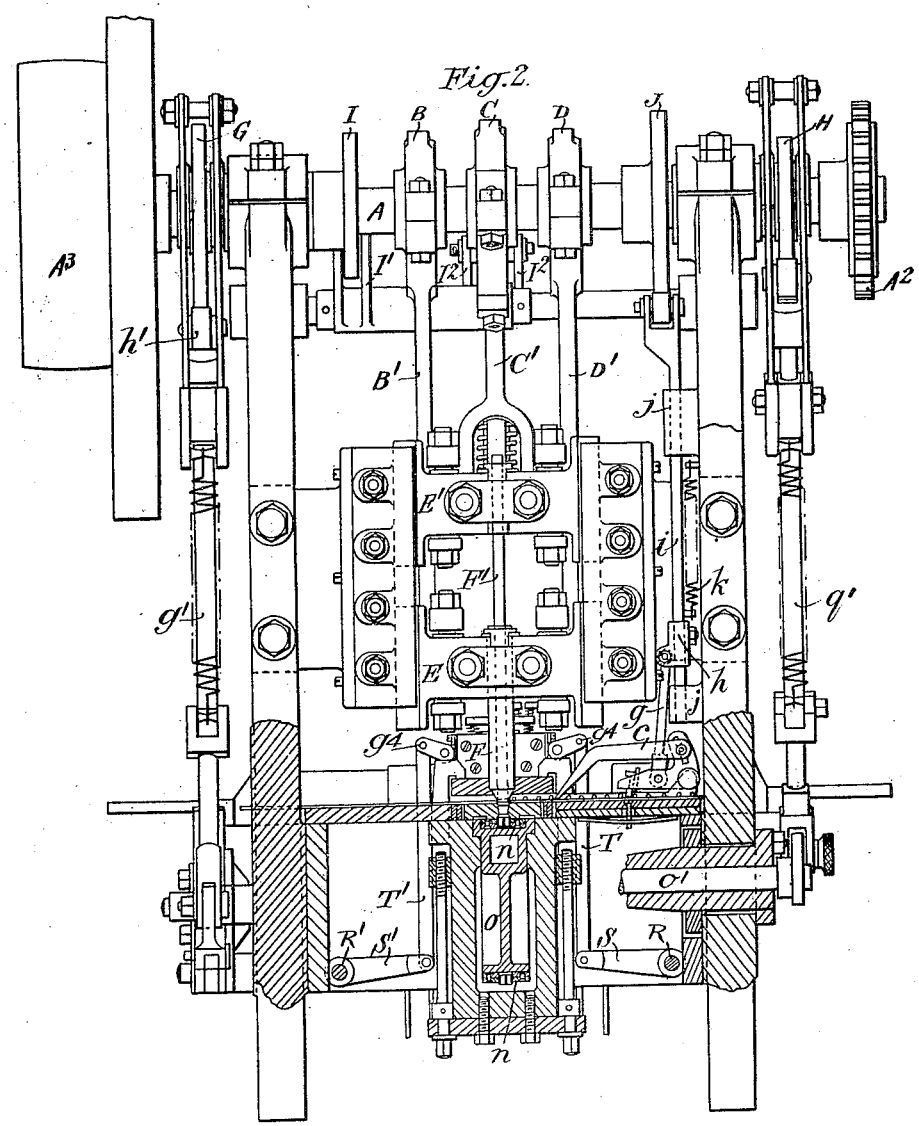
Fig. 2 is a sectional elevation at right angles to the conveyor looking from the rear end of the machine.

Referring more particularly to Figs. 6 to 14 the metallic strip $a$ Fig. 7 from which the blanks for forming the shells of the eyelets are punched by the blanking tool as the strip is fed through the machine to the roller for winding up the scrap strip, having been first subjected to a preliminary operation in a separate machine whereby the dome like sockets $b$ are formed and slotted as shown, is fed under the blanking and cupping tools F, $F^1$, Figs. 2 and 6 and held in the desired position during the blanking and cupping operations by intermittent feeding and locking mechanism including a bifurcated feed pawl $c$. a cranked lever $d$ to which the pawl $c$ is pivotally and adjustably attached by a pivot bolt and slot connection and an adjustable support or carriage $e$ to which the lever $d$ is pivoted, said carriage working in guides $f$ attached to the framing of the machine. The cranked lever $d$ is connected by a link $g$ and clamping collar $h$ to the vertical rod $i$ mounted to slide in vertical guide lugs $j$ on the end frame of the machine and reciprocated by the cam J Figs. 2, 13 and 14 carried by the upper or eccentric shaft A of the machine. Cam J operates on a roller on the upper end of the rod $i$ which is pulled upwards towards the cam by a spring $k$. The long arm of the lever $d$ carries a tooth or stop $l$ which towards the end of the feeding stroke of the pawl $c$ engages the forward face of one of the domes $b$ in the strip $a$ to prevent over-shooting as shown in Fig. 11, which view represents the parts in their normal positions—that is the positions they occupy during blanking and cupping. When by the rotation of the cam J the roller carried by the upper end of the rod $i$ enters the depression in the cam the stop $l$ is lifted out of engagement with the strip $a$ and the feed pawl $c$ drawn back ready to take the strip forward as shown in Fig. 12. By the continued rotation of the cam J the roller is forced out of the depression, producing a downward movement of the rod $i$ and lever $d$ and a forward movement of the pawl $c$ with the strip $a$, when the parts regain their initial positions as shown in Fig. 11. To adjust the strip in the required position so that one of its domes is at each feed movement brought centrally under the blanking and cupping tools, the carriage $e$ is moved bodily forth or back in its guides $f$ by operating the screw $m$.

After the blanking and cupping operation the shell produced thereby is deposited by the cupping tool $F^1$ in the endless conveyor $n$ shown in detail in Figs. 15 to 19 which runs below and at right angles to the path of the strip $a$ upon carrier or guide $o$ formed of a light cast-iron frame upon which is also mounted the lower or reciprocating part of the turning over tool $p$, and which at another part forms a chute $q$ by which the finished eyelets are conducted from the machine.

Referring to Figs. 5 and 16 the conveyor $n$ is carried at one end by the driving wheel $r$, and at the other end by the pair of idle wheels $s$ bearing in the end of the conveyor carrier $o$. As shown on a larger scale in Figs. 17 to 19 the conveyor comprises two endless steel bands $t$, $t$, carrying opposed bridging pieces $u$, $v$, riveted to them on opposite sides. The upper bridge piece $u$ is bored and recessed on its upper side to receive the floating spring collet $w$ which is made a spring fit on the eyelet shells. The lower bridge piece $v$ is reduced in width at its ends and shaped as shown in Figs. 15 and 19 to engage between the teeth of the conveyor wheels $r$, $s$. In the upper face of the conveyor carrier or guide $o$ a channel is formed in which the conveyor travels as shown in Figs. 2 and 25. The conveyor carrier $o$ is supported in the framing of the machine as shown in Fig. 25 and can be bodily withdrawn for inspection when desired.

Referring to Figs. 20 to 24 which show the mechanism for giving a step by step motion to the endless conveyor, $x$ indicates the conveyor driving spindle carrying at about its mid-length the chain wheel $y$ shown in Fig. 16 and at its forward end the ratchet wheels $z$, $z$, and $a^1$ clamped to the flanged sleeve $b^1$ which in turn is keyed to the spindle $x$ as shown in Fig. 22. The driving pawl $c^1$ is pivotally attached to the lever $d^1$ connected by a link $e^1$ to the lever $f^1$ to which is adjustably attached a rod $g^1$ swung upon the upper or eccentric shaft A and carrying at its upper end a roller $h^1$ engaging the cam G as clearly shown in Figs. 21, 23, 24. The two outer ratchet wheels $z$, $z$, are the drivers and act as one wheel while the inner wheel $a^1$ which has its teeth reversed in relation to the teeth of the outer wheels is capable of adjustment on the sleeve $b^1$ in relation to the wheels $z$, $z$, and by the engagement of its teeth with a stop $i^1$ on the lever $d^1$ limits the forward movement of the wheels $z$, $z$, and consequently of the conveyor. The parts are shown in the position they occupy while operations are being simultaneously performed on these eyelet shells in the conveyor which are under the operating tools. On the completion of those operations, namely cupping, insertion of spring, and turning over of eyelet shells the pawl $c^1$ makes a rapid double stroke effecting a one step forward movement of the conveyor. The double stroke of the pawl is produced by the cam G in a manner that will be readily understood from Fig. 23.

The upper or stationary part of the turning over tool $p$ attached to the framing of the machine is shown in Figs. 15 and 25 and parts of the turning over tool operating mechanism are shown in Figs. 25, 26, 29, 30.

The lower end reciprocating part of the turning over tool $p$ attached to the conveyor carrier consists in a steel rod $j^1$ guided at its upper and lower ends in the carrier casting and provided near its lower end with a cross head $k^1$ connected by links $l^1$ to the lever $m^1$ pivoted between the plates $n^1$ screwed to the side faces of the carrier casting. The lever $m^1$ engages the squared end of the operating spindle $o^1$ which projects outside the framing of the machine and carries the slotted lever $p^1$ to which is adjustably attached the rod $q^1$ suspended upon the upper or eccentric shaft A and operated by the cam H in like manner to the conveyor operating mechanism previously described. By manipulation of the screw $r^1$ the position of the centre $s^1$ is adjusted in the slot $t^1$ of lever $p^1$ Fig. 30, to determine the stroke of the rod $j^1$ and consequently the thickness of the finished eyelet. The upper end of the rod $j^1$ is provided with a sleeve $u^1$ which is capable of an axial motion on the rod limited by a pin working in a groove as shown in Fig. 25. A compression spring $v^1$ operates between the under face of the sleeve $u^1$ and the upper face of the cross head $k^1$. Situated vertically over the rod $j^1$ is the stationary part of the turning over tool $p$ consisting of the die $w^1$ provided with a hollow spring plunger $x^1$. In operation the rod $j^1$ rises carrying with it the sleeve $u^1$ which, engaging the lower end of the spring collet in the conveyor lifts the conveyor up to the under face of the die $w^1$ when further movement of the sleeve $u^1$ is is arrested. The rod $j^1$ however continues to rise against the compression of the spring $v^1$ and by so doing lifts the eyelet out of the conveyor collet and forces it into the turning over die $w^1$ against the action of the spring plunger $x^1$. Upon the return stroke of the rod $j^1$ the spring plunger $x^1$ forces the finished eyelet back into the conveyor.

In Fig. 3 and Figs. 31 to 41 are illustrated the device, or pair of devices by means of which predetermined and definite lengths of wire are fed alternately to two spring forming devices.

Supported on the lower cam shaft $A^1$ is an arm $a^2$ provided with brasses or steps $b^2$ where it bears on the shaft, and a tie rod $c^2$ connected to the machine framing to prevent rotation of the arm with the shaft. At its upper end the arm $a^2$ is formed with a split eye fitted with a clamping screw and clamped at its midlength in the said eye is the steel eccentric spindle $d^2$ upon each end of which is rotatably mounted a feed roller gearing with another feed roller of twice its diameter keyed to the cam shaft $A^1$. Each of the rollers mounted on the eccentric spindle $d^2$ comprises an inner sleeve or bearing $e^2$ having a toothed rim $f^2$ at one end and a lock nut $g^2$ on the opposite end which is screw threaded to receive the nut. Sliding freely upon the inner sleeve $e^2$ but prevented from rotation by the feather $h^2$ is another sleeve $i^2$ carrying a flange or roller $j^2$ upon which an index or pointer is engraved as shown. Fitting rotatably on the sleeve $i^2$, is the quadrant piece $k^2$ shewn clearly in Fig. 39 having two sectors machined from its inner face, one to receive the hardened steel quadrant nipping piece $l^2$, and the other the brass graduated quadrant $m^2$ Fig. 41. It will be seen that the quadrants $l^2$, $m^2$, are mounted concentrically with the part $k^2$ but the periphery of the quadrant $l^2$ which co-operates with the larger roller to grip and effect the feed of the wire describes an arc of greater radius than the other quadrant $m^2$ or the part of quadrant piece $k^2$ which coincides with the path of the wire. By slackening the lock nut $g^2$ on the bearing sleeve $e^2$ the position of the quadrant piece $k^2$ in relation to any point on the gears may be adjusted, and determined by reference to the index reading on the graduated quadrant $m^2$ which reading indicates the length of wire that will be fed by that particular setting.

Each of the larger rollers carried by the cam shaft $A^1$ is formed of a cast iron body $n^2$ keyed to the shaft $A^1$ and carrying on one face an annular gear $o^2$ meshing with the toothed rim $f^2$ of the roller of smaller diameter, and on the opposite face a detachable plate or roller $p^2$, the gear $o^2$ and roller $p^2$ being fixed to the body $n^2$ by stud screws. A channel is machined diametrically across the inner face of the body $n^2$ in which is guided the hardened steel slide $q^2$ shaped to a circular segmental form at one end which, when opposed by the quadrant $l^2$ engages and holds the wire $r^2$ by the pressure exerted by a compression spring or springs $s^2$ bearing at one end against the slide and at the other end against a guided block $t^2$, interposed between the springs and the shaft $A^1$ as shewn in Fig. 37. The radial movement of the slide $q^2$ is limited by pins $u^2$ passed through slots in the slide.

For convenience of design, the upper roll is made half the diameter of the lower roll as aforesaid consequently the upper roll makes two revolutions for each turn of the lower roll and cam shaft. As however during the two revolutions of the upper roll its nipping quadrant $l^2$ is only once opposed by the slide $q^2$, one length only of the wire is fed forward.

In Fig. 3 the wire stock $r^2$ for forming the springs is shown passing through suitable straightening devices $u^{20}$ to the feed rolls by which it is fed forward through tubular guides $v^2$ leading to die-blocks or guides $w^2$ in the framing Fig. 50 across which cutters $x^2$ are mounted to reciprocate to sever the required lengths from the stock.

Fig. 42 shows the wire $r^2$ fed through the cutting off die $w^2$ to the required length ready to be cut from the stock by the cutter $x^2$ operating with the forward movement of the outer forming tool $a^3$. Fig. 43 shews the length of wire cut from the stock by the cutter $x^2$ and held by a simultaneous movement of the tool $a^3$ against a tubular stud or pin $b^3$ ready for the formation of the inward bends shewn in Fig. 44.

The tubular pin or stud $b^3$ which is cut away as shewn in Fig. 51 to form at its upper end a semi-annular part to be engaged by the wire, projects upwards from a die plate $c^3$, Figs. 48, 49, 50, 51 and 52 through which it is capable of being lowered at the required moment out of the path of the approaching tool $a^3$.

The four small pins $d^3$ similarly project upwards from the same die plate $c^3$ and are also capable of being lowered and raised again by mechanism hereinafter described at the required times and independently of the centre pin $b^3$.

Two pins $e^3$, $e^3$, project vertically downwards from two cranks $f^3$ Figs. 49 and 51 which carry them and are capable of being rotated by the cranks about vertical axes in opposite directions. By partial rotation of the cranks in the directions indicated by the arrows on Fig. 43 the pins $e^3$, $e^3$, engage the wire $r^2$ and bend its two ends inward between the pins $d^3$ as shown in Fig. 44. On the completion of these bends the crank pins $e^3$ return to their initial position as shewn in Fig. 43 and the four pins $d^3$ are lowered into the die plate $c^3$. An inner forming tool $g^3$ and a vertical spring positioning and conveying tool or carrier $h^3$ next move outwards together while the outer tool $a^3$ simultaneously moves inwards bending the spring around the centre pin $b^3$ and closing the free ends of same upon the carrier $h^3$ as shewn in Figs. 45, and 46.

In the above described operations the outward motion of the carrier $h^3$ is arrested when it has reached a position centrally over the pin $b^3$, the inner tool $g^3$ however continues to move outwards to close the spring upon the carrier.

The spring from the position shewn in Fig. 46 is next carried to the point over the conveyor $n$ at which the springs are inserted in the eyelet shells, the inner and outer tools moving inward together with the carrier $h^3$ until the latter stands vertically over an eyelet shell in the conveyor $n$ when further movement of the carrier $h^3$ is arrested. The inner tool $g^3$ however continues to move inward until it has reached its initial position as shewn in Fig. 47, while the outer tool $a^3$ returns to its initial position as shewn in Fig. 42, leaving the spring supported upon the carrier $h^3$ ready to be operated upon by the inserting tool as will be hereinafter described.

It will be readily understood that as the spring is carried from the position Fig. 46 to the position Fig. 47, by the carrier $h^3$ and as it is not kept in tension during its removal, the following on of the outer tool $a^3$ as described is not essential and would not be necessary were the machine run at a slow speed. As however it is proposed to run these machines at a high speed it follows that the spring if not backed up and thus positively held by the outer tool $a^3$ or some equivalent guarding device would owing to its inertia be left behind when the rapid inward movement of the carrier $h^3$ took place.

Referring to Figs. 48 to 56, two complete spring forming devices situated on the right and left hand respectively of the conveyor, are mounted upon a channel shaped casting $i^3$ which in turn is supported by the side frames of the machine.

Guided within the channel casting $i^3$ and reaching from end to end of same are two rectangular steel slides $j^3$ rigidly connected together by the struts $k^3$, and working in guides machined centrally in the base of the casting $i^3$ are two unconnected slides $l^3$.

The connected slides $j^3$ carry the inner spring forming tool $g^3$ which constitutes in effect two tools, its opposite ends co-operating in turn with the outer spring forming tools $a^3$ carried respectively by the separate slides $l^3$.

The inner tool $g^3$ is carried by the bar $m^3$ screwed across the under faces of the two slides $j^3$ as shewn in Figs. 55 and 56 and is pressed down upon the die plates $c^3$ by springs $n^3$ as shewn in Fig. 51 to prevent the eyelet springs getting between the tool $g^3$ and the die plates.

The outer tools $a^3$ are screwed directly to their respective slides $l^3$ as is clearly shewn in Figs. 49, 50 and 51.

The wire cutters $x^2$ work in channels framed in the base of the casting $i^3$ and are moved forth and back with the slides $l^3$ by engagement of the projections $o^3$ on the blades $x^2$ with notched driving plates $p^3$ on the slides as is clearly shewn in Fig. 50.

Fitting freely between the slides $j^3$ is a block $q^3$ held down in frictional contact with the upper surfaces of the said slides by springs $r^3$ as is clearly shewn in Figs. 54 to 56. On the right and left hand faces of the block $q^3$ vertical guides are formed in which the tool holders $s^3$ for the spring positioning tools or carriers $h^3$ and the spring inserting tools $t^3$ work, the said tool holders being supported in their normal or raised positions by springs $u^3$ as shewn in Fig. 51. At the proper time the holders $s^3$ of the spring inserting tools are depressed against the action of the springs $u^3$ by the plunger $I^3$ which carries at its lower end adjustable studs $i^5$, $i^6$ Figs. 4 and 5 adapted to bear respectively on the upper ends of the holders $s^3$, and upon slides $n^4$ hereinafter referred to. The inserting tools $t^3$ are firmly fixed in their respective tool holders, but the carriers $h^3$ are held frictionally between the inserting tools and are capable of sliding endwise, their normal position as shewn in Fig. 51 being determined by the screw stops $v^3$ engaging their upper ends.

The movements of the block $q^3$ to the right or left Fig. 51 are limited by the four screwed stops $w^3$ attached to the main casting $i^3$ and these stops are so adjusted that when the block is moved by frictional engagement with the slides $j^3$ to the left hand extreme position as shown in Figs. 49 and 51, the left hand carrier $h^3$ is centrally over the left hand pin $b^3$, and the right hand carrier centrally over the conveyor, and when the block is moved to its extreme right hand position, the left hand carrier is over the conveyor and the right hand carrier over the right hand pin $b^3$.

The slides $j^3$ which actuate the inner tool $g^3$ receive their reciprocating motion through adjustable links $N^1$ and levers $M^1$ from cams $L^1$ as described and as clearly shewn in Fig. 3 while the slides $l^3$ which actuate the outer forming tools $a^3$ receive their motion in a similar manner through adjustable links N and levers M from cams L.

The cranks $f^3$ carrying the pins $e^3$ by which the inward bends of the eyelet springs are made as previously described in reference to Fig. 44 are attached to the lower ends of short vertical spindles $a^4$ working in brackets $b^4$ secured to and projecting downwards from the under faces of the bridge pieces $c^4$ fixed to and bridging the channel casting $i^3$ as shewn on Figs. 48, 49 and 51. The upper ends of the vertical spindles $a^4$ carry bevel gear pinions $d^4$ which engage bevel gear sectors $e^4$ rigidly attached to the horizontal shafts $f^4$ bearing in enlarged ends of the bridge pieces $c^4$. The inner ends of the shafts $f^4$ carry short cranks $g^4$ which are respectively connected through systems of links and levers T, S, R, Q, and $T^1$, $S^1$, $R^1$, $Q^1$, to the cams P, $P^1$, actuating these devices as shewn in Fig 3.

The outer or front ends of the shafts $f^4$ carry similar cranks $h^4$ connected to tension springs $i^4$ Figs. 48 and 49 attached to the casting $i^3$ which springs return the cranks $g^4$ to their initial positions after the formation of the inward bends of the eyelet springs as previously described.

When a formed eyelet spring supported on a carrier $h^3$ arrives vertically over the conveyor the plunger $I^3$ descends the inserting tools $t^3$ are forced downwards and with them the carrier $h^3$ until the latter is arrested by the engagement of its lower end with the dome of the eyelet shell in the conveyor. By the continued downward stroke of the inserting tools, the eyelet spring is pushed through the coned spring guide $j^4$ which guide is simultaneously lowered by the plunger $I^3$ so that the coned projection on the under face of the spring guide $j^4$ engages and bears within the edge of the eyelet shell in the conveyor into which the spring is being pushed.

To provide a free passage for the lower ends of the carriers $h^3$ as they travel to and from the conveyor, the spring guide $j^4$ is parted through its mid-length as is clearly shewn in Figs. 50 and 52. For the same purpose a channel $k^4$ is cut in the upper face of the die plates $c^3$ see Figs. 49 and 50.

The outer ends of the guide $j^4$, for the springs are attached adjustably to the feet of two vertical slides $l^4$ guided in channels machined in the outer faces of the casting $i^3$ and retained in place by cover plates $m^4$ Figs. 48 and 52.

Guided in the slides $l^4$ are secondary slides $n^4$ provided at their lower ends with projecting shoulders, which by engaging similar shoulders formed in the slides $l^4$ limit the travel of the slides $n^4$ as will be readily understood from Fig. 48.

The upper ends of the secondary slides $n^4$ are provided with arms projecting to the right and left on the under faces of which bear two compression springs $o^4$ taking their thrust in the casting $i^3$, and two smaller compression springs $p^4$ taking their thrust in the primary slides $l^4$.

To lower the spring guide $j^4$ upon the conveyor as already explained, the reciprocating vertical plunger $I^3$ is brought into engagement with the upper end of the secondary slide $n^4$, the said slide and the slide $l^4$ being together pushed downwards against the pressure of the springs $o^4$ until the movement of the primary slide $l^4$ is arrested by the guide $j^4$ engaging the eyelet shell in the conveyor $n$ when the compression springs $p^4$ take up any further downward motion imparted to the secondary slide.

The mechanisms by which the pins $b^3$ and $d^3$ are raised above and lowered into the die plates $c^3$ are clearly shewn in Figs. 48, 51, 52 and 53.

Each mechanism comprises an angle bracket $q^4$ bolted to the under face of the channel casting $i^3$ provided on its inner face with a pair of vertical guide rails $r^4$ Figs. 52 and 53. An upper block $s^4$ and a lower block $t^4$ each capable of sliding freely on the rails $r^4$ carry respectively the four small pins $d^3$ and the centre tubular pin $b^3$ which pass upwards into and through the die plates $c^3$ as shewn. In their normal positions the blocks are held upon the platforms $u^4$ and $v^4$ forming part of the bracket $q^4$ by compression springs $w^4$ in which position the upper ends of the pins $d^3$ and $b^3$ are drawn down within the die plates.

Each block $s^4$, $t^4$, is connected through links $x^4$, $y^4$, and levers $O^2$, $O^3$, Fig. 3, passing under the machine to engage a cam O or $O^1$ by which the blocks and their attached pin or pins are raised and allowed to fall again at the desired moments as already explained in reference to the Figs. 43 and 44.

The four small pins $d^3$ are secured to the plate $z^4$ screwed to the upper block $s^4$ as shown in Fig. 53 and the central tubular pin $b^3$ is clamped in the block $t^4$ by a set screw $t^5$ as shown in Figs. 48, 51 and 53.

In the foregoing description of the improved machine and the functions of the different operative parts thereof, the various operations on the strip stock and wire have been fully explained. It will be seen that the prepared strip is fed through the machine and operated upon by the blanking and cupping dies to produce therefrom the eyelet shells, the strip then being wound up as scrap. The eyelet shell is deposited by the cupping tool $F^1$ directly into the conveyor $n$ which travels at right angles to and below the strip, bringing the shells successively into position to receive the springs which are formed alternately on opposite sides of the conveyor, then round the wheels

*r s* to the turning over tool *p* and finally to the position of discharge above the chute *q* which corresponds to the shell insertion position, the finished eyelet shell being ejected from the conveyor into the chute *q* by the insertion of a fresh shell into the same conveyor collet.

What I claim and desire to secure by Letters Patent is—

1. A machine for the manufacture of parts of spring press button fasteners, comprising an endless conveyer for bringing eyelet shells to a point of delivery, and duplicate spring-forming and delivering devices, one situated on either side of the conveyor, constructed and arranged to form and alternately deliver springs into successive eyelet shells brought by said conveyor to said point of delivery.

2. In a machine for the manufacture of parts of spring press button fasteners, means for holding eyelet shells in position to receive springs, and duplicate spring-forming and delivering devices, constructed and arranged to have either deliver a spring to an eyelet-shell while the other device is forming a spring for delivery to another eyelet-shell.

3. In a machine for the manufacture of eyelet-shells for spring press button fasteners, a blanking die and an adjustable feed and location mechanism formed to cooperate with domes on a metallic strip from which the eyelet-shells are to be formed to feed the strip forward a regulated amount and distance into the blanking die and other means to forcibly hold the strip against forward or backward movement.

4. In a machine for the manufacture of eyelet-shells for spring press button fasteners, a blanking die and adjustable feed and location means to move a metallic strip forward a regulated amount and distance into the blanking die and other means to forcibly hold the strip against forward or backward movement.

In testimony whereof he has affixed his signature, in presence of two witnesses.

FRANK BRACEBRIDGE MILLS.

Witnesses:
W. LANGLEY SMITH,
W. HAROLD H. LANGLEY-SMITH.